Aug. 8, 1933.  R. S. NEWTON  1,921,092

MULTIPLE-WAY VALVE

Filed March 23, 1931

Inventor
Robert S. Newton
By
Attorneys

Patented Aug. 8, 1933

1,921,092

UNITED STATES PATENT OFFICE 1,921,092

MULTIPLE-WAY VALVE

Robert S. Newton, Watertown, N. Y., assignor to The New York Air Brake Company, a Corporation of New Jersey Application March 23, 1931. Serial No. 524,735

3 Claims. (Cl. 277—14)

This invention relates to multiple-way valves, and particularly to dual supply and exhaust valves useful, for example, in controlling double-acting motor cylinders.

Important features of novelty reside in features of construction which render the valve self-retaining in either setting.

The preferred embodiment of the invention is illustrated in the accompanying drawing, in which,—

Figure 1:
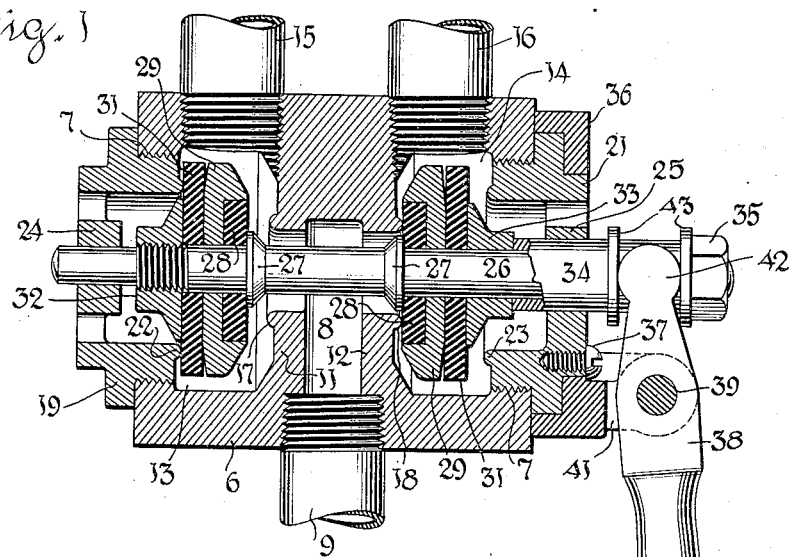
Figure 1 is a vertical axial section.
Figure 2:
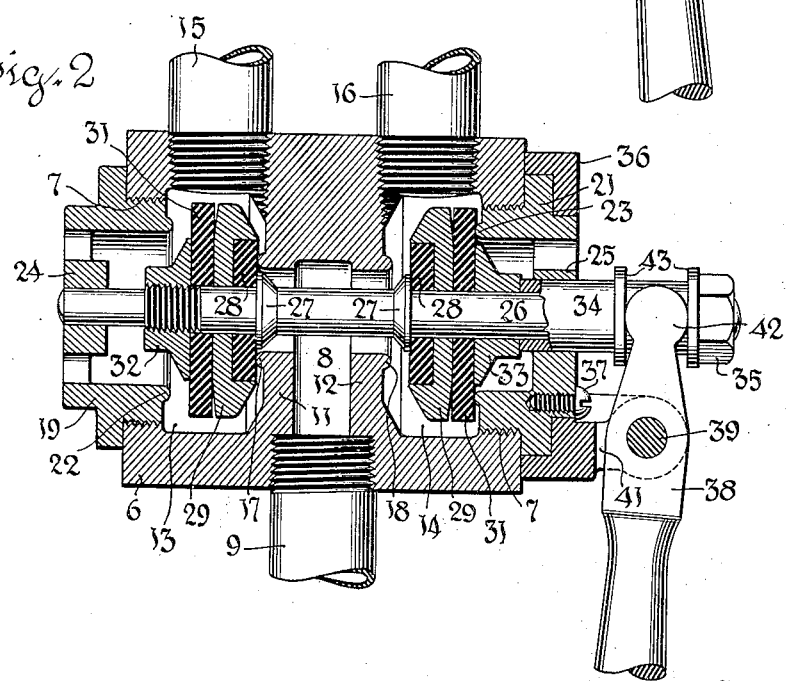
Figure 2 is a similar view showing the parts in the reverse setting.

The body 6 of the valve is generally cylindrical, with open ends threaded as indicated at 7. There is a central chamber 8 to which the pressure fluid supply line 9 leads, separated by partitions 11 and 12 from two end chambers 13 and 14. From one chamber, 13, the line 15 leads to some space (not shown) in which pressure is to be controlled. A similar line, 16, leads to another space in which pressure is to be controlled. These two spaces may be, but are not necessarily, the two ends of a fluid pressure motor cylinder.

There are ports leading from the chamber 8 through partitions 11 and 12 to chambers 13 and 14 and surrounding these ports on the outer sides of the partitions are inlet valve seats 17 and 18 formed as rounded rims or beads.

Screwed into the threads 7 at each end of the body 6 are bushings 19 and 21 on the inner ends of which are exhaust valve seats 22 and 23 of substantially larger diameter than the inlet valve seats 17 and 18, but like them formed as rounded rims or beads. Thus the inlet valve seat 17 is opposed to the exhaust valve seat 22 in chamber 13 and the inlet valve seat 18 is opposed to exhaust valve seat 23 in chamber 14.

Passages lead to atmosphere through bushings 19 and 21, there being in said passages spiders which sustain hubs 24 and 25 having guide ways for the valve stem.

The stem 26 is formed with two flanges or collars 27 near its middle. Against each of these is assembled a valve unit made up of an inlet valve gasket 28, a metal valve body 29 and an exhaust valve gasket 31. The left hand unit is retained by a nut 32 threaded on the stem 26. The right hand unit is retained by a disc 33, and sleeve 34 both encircling the valve stem, and a nut 35 screwed on the ringht hand end of the stem.

The parts are so proportioned that the inlet valve of either unit and the exhaust valve of the other unit seats simultaneously. To afford some flexibility and ensure tight seating of both gaskets the exhaust valve gasket of each unit is confined only at its center and is backed up by a convex face on the body 29.

Since the exhaust valve seat is larger than the inlet valve seat, pressure acting on the exhaust valve, in either limiting position, predominates and retains the valve, in whichever of its two limiting positions it is set.

The stem 26 is guided at one end in hub 24. At the other end, the sleeve 34 is guided in hub 25. Any suitable means may be adopted for shifting the stem 26, but the following arrangement is preferred.

A ring 36 is swiveled on bushing 21 and is retained and locked by screws. one of which appears at 37. The swiveled mounting of ring 36 permits the actuating handle to be adjusted to suit. The handle 38 is pivoted at 39 to bracket 41 on ring 36, and has a forked end 42 straddling sleeve 34 and confined between flanges 43 on the sleeve.

The valve has been used to control double acting pneumatic motors operating chucks, work clamps and similar devices and has the advantage of being self retaining. All that is necessary to reverse the action of the motor is to shift the valve from one limiting position to the other. This is easily done, since the only resistance offered is the pressure acting on the difference between valve areas.

Modifications of structure are possible within the scope of the invention and are contemplated. The valve is available for a wide variety of uses and to control various pressure fluids.

What is claimed is:

1. In a valve mechanism, the combination of a body enclosing two chambers in which alternately pressure is to be established, and a pressure-fluid supply passage communicating with each of said two chambers; supply valve seats reversely arranged relatively to each other and controlling such communications; exhaust valve seats reversely arranged relatively to each other and controlling exhaust passages from said two chambers, the supply and exhaust valve seats for each of the two chambers being reversely arranged relatively to each other and of different areas; and supply and exhaust poppet valve means coacting with the seats of the two chambers and movable as a unit to close simultaneously the supply to either chamber and the exhaust from the other.

2. In a valve mechanism, the combination of a body enclosing two chambers in which alternately pressure is to be established, and an intervening pressure-fluid supply passage communicating with each of said two chambers; supply valve seats reversely arranged relatively to each other, and controlling said communications; exhaust valve seats reversely arranged relatively to each other and controlling exhaust passages from said two chambers, the supply and exhaust valve seats for each chamber being opposed to each other within the chamber and the exhaust valve seat being the larger; and inwardly opening poppet supply and exhaust valves coacting with the seats of both chambers and movable as a unit to close simultaneously the supply to either chamber and the exhaust from the other.

3. The combination of claim 1 further characterized in that the poppet valve means include flexible elements adapted to ensure tight sealing of the valve elements simultaneously closed.

ROBERT S. NEWTON.